United States Patent
Ohkura et al.

(10) Patent No.: US 10,961,332 B2
(45) Date of Patent: Mar. 30, 2021

(54) METHOD FOR PRODUCING POLYMER

(71) Applicant: AGC INC., Chiyoda-ku (JP)

(72) Inventors: Masahiro Ohkura, Tokyo (JP); Kenta Natsukawa, Tokyo (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 16/564,610

(22) Filed: Sep. 9, 2019

(65) Prior Publication Data

US 2019/0389983 A1    Dec. 26, 2019

Related U.S. Application Data

(63) Continuation of application No. PCT/JP2018/008642, filed on Mar. 6, 2018.

(30) Foreign Application Priority Data

Mar. 9, 2017 (JP) .............................. JP2017-045408

(51) Int. Cl.
| | |
|---|---|
| C08F 14/18 | (2006.01) |
| C08F 297/00 | (2006.01) |
| C08F 14/20 | (2006.01) |
| C08F 14/22 | (2006.01) |
| C08F 14/26 | (2006.01) |
| C08F 14/28 | (2006.01) |
| C08F 4/42 | (2006.01) |

(52) U.S. Cl.
CPC .......... *C08F 14/185* (2013.01); *C08F 297/00* (2013.01)

(58) Field of Classification Search
USPC .......................................... 526/194; 525/276
See application file for complete search history.

(56) References Cited

U.S. PATENT DOCUMENTS

| | | | |
|---|---|---|---|
| 2005/0245714 A1 | 11/2005 | Yamago et al. | |
| 2006/0135711 A1 | 6/2006 | Yamago et al. | |
| 2006/0167199 A1 | 7/2006 | Yamago et al. | |
| 2006/0199927 A1 | 9/2006 | Yamago et al. | |
| 2008/0004366 A1 | 1/2008 | Yamago et al. | |
| 2008/0009597 A1 | 1/2008 | Yamago et al. | |
| 2015/0119523 A1 | 4/2015 | Ameduri et al. | |
| 2016/0009971 A1* | 1/2016 | Wang ................. | C08G 18/4018 428/314.4 |
| 2019/0292146 A1* | 9/2019 | Bando ................. | C08F 220/12 |

FOREIGN PATENT DOCUMENTS

| | | |
|---|---|---|
| JP | 2004-323437 A | 11/2004 |
| JP | 2004-323693 A | 11/2004 |
| JP | 2006-225524 A | 8/2006 |
| JP | 2007-277533 A | 10/2007 |
| JP | 2007-302737 A | 11/2007 |
| JP | 2010-209283 A | 9/2010 |
| JP | 2012-236984 A | 12/2012 |
| JP | 2015-514854 A | 5/2015 |
| WO | WO 2004/014848 A1 | 2/2004 |
| WO | WO 2004/014962 A1 | 2/2004 |
| WO | WO 2004/072126 A1 | 8/2004 |
| WO | WO 2004/096870 A1 | 11/2004 |

OTHER PUBLICATIONS

International Search Report dated Jun. 12, 2018 in PCT/JP2018/008642 filed Mar. 6, 2018 (with English translation).
Written Opinion dated Jun. 12, 2018 in PCT/JP2018/008642 filed Mar. 6, 2018.
Yamago, S, et al. "Synthesis of Organotellurium-Initiators Bearing Fluorous Substituent and Their Application to Living Radical Polymerization," 2D03_Polymer Preprints, Japan vol. 65, No. 1 (2016), 2 pages (with English Abstract).

* cited by examiner

*Primary Examiner* — Fred M Teskin
(74) *Attorney, Agent, or Firm* — Oblon, McClelland, Maier & Neustadt, L.L.P.

(57) ABSTRACT

The present invention relates to a method of producing a polymer including: polymerizing a compound represented by the following formula (3); or copolymerizing the compound represented by the following formula (3) with a compound (6) having a reactive carbon-carbon double bond and differing from the compound represented by the following formula (3), in a presence of at least one compound selected from the group consisting of compounds represented by the following formula (1) and compounds represented by the following formula (2).

19 Claims, No Drawings

METHOD FOR PRODUCING POLYMER

TECHNICAL FIELD

The present invention relates to a method of producing a polymer by radical-polymerizing a haloolefin in the presence of an organotellurium compound.

BACKGROUND ART

Radical polymerization reactions have been extensively used industrially because a wide range of monomers can be used and the reactions can be easily carried out even in polar media such as water. In general radical polymerization methods, however, molecular-weight control is limited and the polymers obtained are apt to have a wide molecular-weight distribution.

Meanwhile, living radical polymerization has been attracting attention as a polymerization technique for yielding a polymer having a controlled molecular weight and a narrow molecular-weight distribution, and various polymerization control agents have been developed.

In living radical polymerization, by utilizing a polymer obtained as a polymerization macroinitiator or a macro chain transfer agent, different monomers can be copolymerized therewith.

For example, Patent Documents 1 and 2 each describe a method in which a vinyl monomer is polymerized by living radical polymerization using an organotellurium compound. Patent Document 3 describes a method in which trifluoroethylene is copolymerized with other monomer(s) by living radical copolymerization using a xanthate compound, a trithiocarbonate compound, or a monoiodide compound.

CITATION LIST

Patent Literature

Patent Document 1: International Publication WO 2004/014848
Patent Document 2: JP-A-2012-236984
Patent Document 3: JP-T-2015-514854

SUMMARY OF THE INVENTION

Technical Problem

However, it has not been known so far that a haloolefin polymer useful in macromolecular design, etc. can be produced by radical-polymerizing a haloolefin in the presence of an organotellurium compound.

An object of the present invention, which has been achieved in view of such circumstances, is to radical-polymerize a haloolefin to produce a useful haloolefin polymer or copolymer.

Solution to the Problem

The present inventors have diligently made investigations and, as a result, have discovered that the above-described problem can be solved by polymerizing a specific haloolefin in the presence of a specific tellurium compound. The present invention has been thus completed.

The present invention relates to the following <1> to <11>.

<1> A method of producing a polymer including: polymerizing a compound represented by the following formula (3); or copolymerizing the compound represented by the following formula (3) with a compound (6) having a reactive carbon-carbon double bond and differing from the compound represented by the following formula (3), in a presence of at least one compound selected from the group consisting of compounds represented by the following formula (1) and compounds represented by the following formula (2):

[Chem. 1]

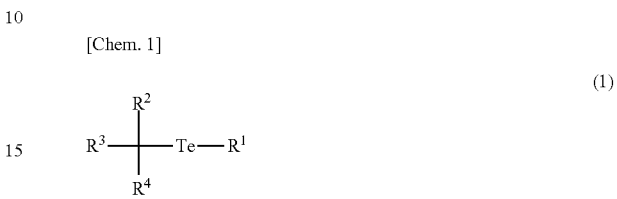

(in the formula, $R^1$ represents an alkyl group having a carbon number of 1-8, a substituted alkyl group having a carbon number of 1-8, an aryl group having a carbon number of 3-12, or a substituted aryl group having a carbon number of 3-16; $R^2$ and $R^3$ each independently represent a hydrogen atom or an alkyl group having a carbon number of 1-8; and $R^4$ represents a hydrogen atom, an alkyl group having a carbon number of 1-8, a substituted alkyl group having a carbon number of 1-8, an aryl group having a carbon number of 3-12, a substituted aryl group having a carbon number of 3-16, an acyl group having a carbon number of 2-8, an amide group having a carbon number of 2-8, an oxycarbonyl group, or a cyano group);

[Chem. 2]

$$(R^5Te)_2 \quad (2)$$

(in the formula, $R^5$ represents an alkyl group having a carbon number of 1-8, a substituted alkyl group having a carbon number of 1-8, an aryl group having a carbon number of 3-12, or a substituted aryl group having a carbon number of 3-16); and

[Chem. 3]

(in the formula, $X^1$ represents a fluorine atom or a chlorine atom; $X^2$, $X^3$, and $X^4$ each independently represent a hydrogen atom, a fluorine atom, a chlorine atom, or $—CX^5X^6X^7$; and $X^5$, $X^6$, and $X^7$ each independently represent a hydrogen atom, a fluorine atom, or a chlorine atom).

<2> The method of producing a polymer according to <1> above in which the compound represented by the formula (3) is one or more kinds selected from the group consisting of vinyl fluoride, vinylidene fluoride, trifluoroethylene, chlorotrifluoroethylene, tetrafluoroethylene, hexafluoropropylene, tetrafluoropropylene, vinylidene chloride, vinyl chloride, 1-chloro-1-fluoroethylene, and 1,2-dichloro-1,2-difluoroethylene.

<3> The method of producing a polymer according to <1> or <2> above in which the compound represented by the formula (1) is a compound in which $R^1$ is an alkyl group having a carbon number of 1-4 or a phenyl group, $R^2$ and $R^3$ are each independently a hydrogen atom or an alkyl group having a carbon number of 1-4, and $R^4$ is an aryl group having a carbon number of 5-12 or an oxycarbonyl group.
<4> The method of producing a polymer according to any one of <1> to <3> above in which the compound represented by the formula (2) is a compound in which $R^5$ is an alkyl group having a carbon number of 1-4 or a phenyl group.
<5> The method of producing a polymer according to any one of <1> to <4> above providing the polymer having a molecular-weight distribution of 2.0 or less.
<6> The method of producing a polymer according to any one of <1> to <5> above further using an azo-compound polymerization initiator.
<7> The method of producing a polymer according to <6> above in which the azo-compound polymerization initiator is used in an amount of 0.01-100 mol per mole of a total amount of the compound represented by the formula (1) and the compound represented by the formula (2).
<8> The method of producing a polymer according to any one of <1> to <7> above in which the compound represented by the formula (3) and the compound (6) are copolymerized by a block copolymerization.
<9> The method of producing a polymer according to <8> above in which the compound (6) is styrene.
<10> The method of producing a polymer according to any one of <1> to <7> above in which the compound represented by the formula (3) and the compound (6) are copolymerized by a random copolymerization.
<11> The method of producing a polymer according to <10> above in which the compound (6) is styrene or vinyl acetate.

Advantageous Effects of the Invention

The present invention can provide a method of radical-polymerizing a specific haloolefin in the presence of a specific tellurium compound.
By using a haloolefin as a starting material, an obtained polymer can be imparted with flame retardancy and chemical resistance. Although it is generally thought that use of a haloolefin as a starting material is less apt to result in a narrow molecular-weight distribution, it is easy, according to the present invention, to obtain a polymer having a narrow molecular-weight distribution.

MODES FOR CARRYING OUT THE INVENTION

The present invention is explained below in detail. However, the present invention is not construed as being limited to the following embodiments and can be modified and implemented at will unless departing from the gist of the present invention.
In this description, "a compound represented by formula (n)" is sometimes referred to simply as "a compound (n)".
The term "carbon number" means the total number of the carbon atoms contained in an entire group. In the case where the group has no substituent, that term means the number of the carbon atoms constituting the framework of the group. In the case where the group has a substituent(s), that term means the sum of the number of the carbon atoms constituting the framework of the group and the number of the carbon atoms contained in the substituent(s).
The term "aryl group" means a monovalent group corresponding to a residue formed by removing one hydrogen atom bonded to any one carbon atom among the carbon atoms constituting the aromatic ring of an aromatic compound. That term is used as a general term for a homoaryl group, which is derived from a carbocyclic compound, and a heteroaryl group, which is derived from a heterocyclic compound.
The term "reactive carbon-carbon double bond" means a carbon-carbon double bond capable of undergoing various reactions as olefins and does not include an aromatic double bond.
A first embodiment of the present invention relates to a method of producing a polymer by radical-polymerizing a compound represented by the formula (3) in the presence of a specific organotellurium compound.
A second embodiment of the present invention relates to a method of producing a polymer by radical-polymerizing a compound represented by the formula (3) and a compound (hereinafter often referred to as compound (6)) having a reactive carbon-carbon double bond and differing from the compound represented by the formula (3), in the presence of a specific organotellurium compound.
[Organotellurium Compound]
Usable as the specific organotellurium compound in the present invention is an organotellurium compound represented by the formula (1), an organic ditellurium compound represented by the formula (2), or a combination of both.
In this description, an organotellurium compound represented by the formula (1), an organic ditellurium compound represented by the formula (2), and a combination of both are sometimes inclusively referred to simply as organotellurium compounds.
(Compound (1))
In the compound (1), $R^1$ to $R^4$ are as defined above.
The groups represented by $R^1$ are specifically as follows.
Examples of the alkyl group having carbon number of 1-8 include linear, branched, or cyclic alkyl groups having carbon number of 1-8, such as a methyl group, an ethyl group, an n-propyl group, an isopropyl group, a cyclopropyl group, an n-butyl group, a sec-butyl group, a tert-butyl group, a cyclobutyl group, an n-pentyl group, an n-hexyl group, an n-heptyl group, and an n-octyl group.
Preferred of these are linear or branched alkyl groups having carbon number of 1-4. More preferred are a methyl group, an ethyl group, and an n-butyl group.
Examples of the substituted alkyl group having carbon number of 1-8 include alkyl groups having a substituent(s) such as fluorine atom, chlorine atom, alkoxy groups, or fluoroalkoxy groups, at any desired positions.
Preferred of these are alkyl groups having 2-13 fluorine atoms. More preferred are (perfluoroalkyl)ethyl groups (having carbon number of 3-8), from a standpoint of inhibiting hydrogen atom abstraction reactions caused by radicals.
Examples of the aryl groups having carbon number of 3-12 include homoaryl groups such as a phenyl group and a naphthyl group and heteroaryl groups such as a pyridyl group, a pyrrole group, a furyl group, and a thienyl group. Preferred are homoaryl groups. More preferred is a phenyl group.
Examples of the substituted aryl group having carbon number of 3-16 include aryl groups having, at any desired positions, one to four (preferably one to three, more preferably one, each preferably at a para or an ortho position) substituents including, for example, a halogen atom, a hydroxyl group, an alkoxy group, an amino group, a nitro group, a cyano group, a carbonyl-containing group represented by —$COR^a$ [$R^a$ is an alkyl group having carbon number of 1-8 (preferably a linear or branched alkyl group having carbon number of 1-4), an alkoxy group having carbon number of 1-8 (preferably a linear or branched alkoxy group having carbon number of 1-4), an aryl group, or an aryloxy group], a sulfonyl group, and a trifluoromethyl group.

The groups represented by $R^2$ and $R^3$ are specifically as follows.

Examples of the alkyl groups having carbon number of 1-8 include the same groups as the alkyl group having carbon number of 1-8 shown above for $R^1$.

$R^2$ and $R^3$ are each preferably a hydrogen atom or an alkyl group having carbon number of 1-4.

The groups represented by $R^4$ are specifically as follows.

Examples of the alkyl group having carbon number of 1-8, substituted alkyl group having carbon number of 1-8, aryl group having carbon number of 3-12, and substituted aryl group having carbon number of 3-16 include the same groups as those shown above for $R^1$.

Examples of the acyl group having carbon number of 2-8 include an acetyl group and a benzoyl group.

Examples of the amide groups having carbon number of 2-8 include carbamoyl group-containing groups such as a carbamoylmethyl group, a dicarbamoylmethyl group, and a 4-carbamoylphenyl group, thiocarbamoyl group-containing groups such as a thiocarbamoylmethyl group and a 4-thiocarbamoylphenyl group, and N-substituted-carbamoyl group-containing groups such as a dimethylcarbamoylmethyl group.

Examples of the oxycarbonyl group include groups represented by —COOR$^b$ [R$^b$ is H, an alkyl group having carbon number of 1-8 (preferably a linear or branched alkyl group having carbon number of 1-4), an alkenyl group having carbon number of 2-8 (preferably a linear or branched alkenyl group having carbon number of 2-4), an alkynyl group having carbon number of 2-8 (preferably a linear or branched alkynyl group having carbon number of 2-4), or an aryl group having carbon number of 3-12].

The alkyl group having carbon number of 1-8, alkenyl group having carbon number of 2-8, alkynyl group having carbon number of 2-8, and aryl group having carbon number of 3-12 which are represented by R$^b$ each may have, at any desired positions, one to four (preferably one to three, more preferably one) substituents including, for example, a halogen atom, a hydroxyl group, an alkoxy group, a trialkylsilyl ether group, a trialkylsilyl group, an amino group, a nitro group, a cyano group, a sulfonyl group, and a trifluoromethyl group.

Examples of the oxycarbonyl group include a carboxy group, a methoxycarbonyl group, an ethoxycarbonyl group, a propoxycarbonyl group, an n-butoxycarbonyl group, a sec-butoxycarbonyl group, a tert-butoxycarbonyl group, an n-pentoxycarbonyl group, and a phenoxycarbonyl group. Preferred is a methoxycarbonyl group or an ethoxycarbonyl group.

It is preferable that $R^4$ is an aryl group having carbon number of 5-12, an oxycarbonyl group, or a cyano group among those.

A preferred compound (1) is a compound in which $R^1$ is an alkyl group having carbon number of 1-4 or a phenyl group, $R^2$ and $R^3$ are each independently a hydrogen atom or an alkyl group having carbon number of 1-4, and $R^4$ is an aryl group having carbon number of 5-12 or an oxycarbonyl group.

A especially preferred is a compound in which $R^1$ is an alkyl group having carbon number of 1-4 or a phenyl group, $R^2$ and $R^3$ are each independently a hydrogen atom or an alkyl group having carbon number of 1-4, and $R^4$ is a phenyl, methoxycarbonyl group, or ethoxycarbonyl group.

Specific examples of the compound (1) include compounds described in International Publication WO 2004/014848 and International Publication WO 2004/014962, such as (methyltellanylmethyl)benzene, (methyltellanylmethyl)naphthalene, ethyl-2-methyl-2-methyltellanyl-propionate, ethyl-2-methyl-2-n-butyltellanyl-propionate, (2-trimethyl siloxyethyl)-2-methyl-2-methyltellanyl-propionate, (2-hydroxyethyl)-2-methyl-2-methyltellanyl-propionate, and (3-trimethylsilylpropargyl)-2-methyl-2-methyltellanyl-propionate. Specific examples thereof further include the compounds described in Polymer Preprints, Japan, Vol. 65, No. 1 (2016), publication No. 2D03, such as ethyl-2-methyl-2-1H,1H,2H,2H-heptadecafluorodecyltellanyl-propionate, methyl-2-methyl-2-1H,1H,2H,2H-heptadecafluorodecyltellanyl-propionate, and N,N-diethyl-2-methyl-2-1H,1H,2H, 2H-heptadecafluorodecyltellanyl-propionamide.

Methods for producing the compound (1) are not particularly limited, and the compound can be produced by the known methods described in the aforementioned International Publication WO 2004/014848 and International Publication WO 2004/014962.

For example, a compound (1) can be produced by reacting a compound represented by the following general formula (4), a compound represented by the following general formula (5), and metallic tellurium.

[Chem. 4]

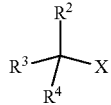

(4)

In the formula, $R^2$, $R^3$, and $R^4$ are as defined above with regard to the formula (1).

X is a halogen atom, preferably a chlorine atom, bromine atom, or iodine atom.

[Chem. 5]

(5)

In the formula, $R^1$ is as defined above with regard to the formula (1). M represents an alkali metal, an alkaline earth metal, or a copper atom. Symbol m represents 1 in the case where M is an alkali metal, m represents 2 in the case where M is an alkaline earth metal, and m represents 1 or 2 in the case where M is a copper atom. In the case where m is 2, the multiple $R^1$ may be the same or different.

Examples of what is represented by M include: alkali metals such as lithium, sodium, and potassium; alkaline earth metals such as magnesium and calcium; and copper. Preferred of these is lithium.

In the case where M is magnesium, examples of the compound of the general formula (5) include compounds represented by Mg(R$^1$)$_2$. It is, however, possible to use a compound (Grignard reagent) represented by R$^1$MgX (X is a halogen atom) simultaneously with the Mg(R$^1$)$_2$ or in place of the Mg(R$^1$)$_2$. X is preferably a chlorine atom or a bromine atom.

(Compound (2))

In compound (2), $R^5$ has the same meaning as the $R^1$ defined in the formula (1).

A preferred compound (2) is a compound in which $R^5$ is an alkyl group having carbon number of 1-4 or a phenyl group.

Specific examples of the compound (2) include dimethyl ditelluride, diethyl ditelluride, di-n-propyl ditelluride, diisopropyl ditelluride, dicyclopropyl ditelluride, di-n-butyl ditelluride, di-sec-butyl ditelluride, di-tert-butyl ditelluride, dicyclobutyl ditelluride, diphenyl ditelluride, bis-(p-methoxyphenyl) ditelluride, bis-(p-aminophenyl) ditelluride, bis-(p-nitrophenyl) ditelluride, bis-(p-cyanophenyl) ditelluride, bis-(p-sulfonylphenyl) ditelluride, dinaphthyl ditelluride, and dipyridyl ditelluride.

Preferred of these are dimethyl ditelluride, diethyl ditelluride, di-n-propyl ditelluride, di-n-butyl ditelluride, and diphenyl ditelluride.

The compound (1) can be produced also by reacting a compound (2) with an azo-compound polymerization initiator; this is a known method described in, for example, JP-A-2004-323437. This reaction may be conducted before the radical polymerization is performed or may be conducted in the presence of the monomer(s) simultaneously with the radical polymerization.

[Monomers]
(Compound (3))

In the first embodiment and second embodiment of the present invention, a compound (3) is used as a monomer to be subjected to radical polymerization. In the compound (3), $X^1$ to $X^4$ are as defined above.

$X^1$ is preferably a fluorine atom.

$X^2$, $X^3$, and $X^4$ are each preferably a hydrogen atom or a fluorine atom.

In the case where only one of $X^2$, $X^3$, and $X^4$ is —$CX^5X^6X^7$, this compound (3) has a propylene structure. It is preferable that $X^3$ or $X^4$ is —$CX^5X^6X^7$. It is more preferable from the standpoint of polymerization reactivity that $X^3$ is —$CX^5X^6X^7$.

Preferred examples of the compound (3) include vinyl fluoride, vinylidene fluoride, trifluoroethylene, chlorotrifluoroethylene, tetrafluoroethylene, hexafluoropropylene, tetrafluoropropylene, vinylidene chloride, vinyl chloride, 1-chloro-1-fluoroethylene, and 1,2-dichloro-1,2-difluoroethylene.

More preferred examples of the compound (3) among these are vinylidene fluoride, trifluoroethylene, chlorotrifluoroethylene, tetrafluoroethylene, hexafluoropropylene, tetrafluoropropylene, and 1,2-dichloro-1,2-difluoroethylene.

Only one kind of the compound (3) may be used, or two or more kinds thereof may be used in combination. In the case of using two or more kinds of compounds (3), they may be used after being mixed together (in the case of random copolymerization, etc.) or may be successively used (in the case of block copolymerization, etc.).

(Compound (6))

In the second embodiment of the present invention, a compound (6) having a reactive carbon-carbon double bond is used together with the compound (3) as monomers to be subjected to radical polymerization. The compound (6) is a compound which differs from the compound (3).

The compound (6) is not particularly limited so long as it is radical-polymerizable. Examples thereof include ethylene; isobutylene; butadiene; (meth)acrylic ester monomers such as methyl (meth)acrylate, ethyl (meth)acrylate, propyl (meth)acrylate, butyl (meth)acrylate, octyl (meth)acrylate, and lauryl (meth)acrylate; cycloalkyl group-containing unsaturated monomers such as cyclohexyl (meth)acrylate, methylcyclohexyl (meth)acrylate, isobornyl (meth)acrylate, and cyclododecyl (meth)acrylate; carboxyl group-containing unsaturated monomers such as (meth)acrylic acid, maleic acid, fumaric acid, itaconic acid, citraconic acid, crotonic acid, maleic anhydride, and itaconic anhydride; tertiary-amine-containing unsaturated monomers such as N,N-dimehtylaminopropyl(meth)acrylamide, N,N-dimethylaminoethyl(meth)acrylamide, 2-(dimethyl amino)ethyl (meth)acrylate, and N,N-dimethylaminopropyl (meth)acrylate; quaternary-ammonium base-containing unsaturated monomers, such as N-2-hydroxy-3-acryloyloxypropyl-N,N, N-trimethylammonium chloride and N-methacryloylaminoethyl-N,N,N-dimethylbenzylammonium chloride; epoxy group-containing unsaturated monomers such as glycidyl (meth)acrylate; styrene monomers such as styrene, α-methylstyrene, 4-methylstyrene, 2-methylstyrene, 3-methylstyrene, 4-methoxystyrene, 2-hydroxymethyl styrene, 2-chlorostyrene, 4-chlorostyrene, 2,4-dichlorostyrene, 1-vinylnaphthalene, divinylbenzene, 4-(chloromethyl)styrene, 2-(chloromethyl)styrene, 3-(chloromethyl)styrene, and 4-styrenesulfonic acid or alkali metal salts (e.g., sodium salt and potassium salt) thereof; heterocycle-containing unsaturated monomers such as 2-vinylthiophene and N-methyl-2-vinylpyrrole; vinylamides such as N-vinylformamide and N-vinylacetamide; α-olefins such as propylene, 4-methyl-1-pentene, 1-hexene, 1-octene, and 1-decene; vinyl ethers such as methyl vinyl ether, ethyl vinyl ether, butyl vinyl ether, cyclohexyl vinyl ether, 2-hydroxyethyl vinyl ether, and 4-hydroxybutyl vinyl ether; methyl isopropenyl ether; vinyl acetate; isopropenyl acetate; hydroxyethyl methacrylate; acrylonitrile; acrylamide; and N,N-dimethylacrylamide.

In this description, "(meth)acrylic acid" is a general term for "acrylic acid" and "methacrylic acid"; "(meth)acrylamide" is a general term for "acrylamide" and "methacrylamide"; and "(meth)acrylate" is a general term for "acrylate" and "methacrylate".

Preferred of those are (meth)acrylic ester monomers, tertiary-amine-containing unsaturated monomers, styrene monomers, vinyl acetate, acrylamide, and N,N-dimethylacrylamide.

Preferred examples of (meth)acrylic ester monomers include methyl (meth)acrylate, ethyl (meth)acrylate, propyl (meth)acrylate, and butyl (meth)acrylate. Especially preferred are methyl (meth)acrylate and butyl (meth)acrylate.

Preferred examples of tertiary-amine-containing unsaturated monomers are N,N-dimethylaminoethyl(meth)acrylamide and 2-(dimethyl amino)ethyl (meth)acrylate.

Preferred examples of styrene monomers are styrene, α-methylstyrene, 2-methylstyrene, 4-methylstyrene, 4-methoxystyrene, 4-chlorostyrene, 4-(chloromethyl)styrene, divinylbenzene, and 4-styrenesulfonic acid and alkali metal salts (sodium salt and potassium salt) thereof.

Especially preferred of these are styrene, 4-methoxystyrene, 4-chlorostyrene, and 4-(chloromethyl)styrene.

[Radical Polymerization]
(Radical Polymerization of Compound (3))

In the first embodiment of the present invention, the compound (3) is radical-polymerized in the presence of an organotellurium compound.

A specific method of the radical polymerization is as follows.

The compound (3) and at least one compound selected from the group consisting of the compound (1) and compound (2) are mixed in a vessel which has undergone displacement with an inert gas or in a vessel which has been evacuated under vacuum.

Examples of the inert gas include nitrogen gas, argon gas, and helium gas. Preferred of these are nitrogen gas and argon gas. More preferred is nitrogen gas.

In the present invention, an azo-compound polymerization initiator may be further used for the purpose of heightening the rate of polymerization. The azo-compound polymerization initiator to be used is not particularly limited so long as it is an azo-compound polymerization initiator for use in ordinary radical polymerization.

Examples of the azo-compound polymerization initiator include 2,2'-azobis(isobutyronitrile) (AIBN), 2,2'-azobis(2-methylbutyronitrile) (AMBN), 2,2'-azobis(2,4-dimethylvaleronitrile) (ADVN), 1,1'-azobis(1-cyclohexanecarbonitrile) (ACHN), dimethyl-2,2'-azobisisobutyrate (MAIB), 4,4'-azobis(4-cyanovalerianic acid) (ACVA), 1,1'-azobis(1-acetoxy-1-phenylethane), 2,2'-azobis(2-methylbutyramide), 2,2'-azobis(4-methoxy-2,4-dimethylvaleronitrile), 2,2'-azobis(2-methylamidinopropane) dihydrochloride, 2,2'-azobis[2-(2-imidazolin-2-yl)propane], 2,2'-azobis[2-methyl-N-(2-hydroxyethyl)propionamide], 2,2'-azobis(2,4,4-trimethylpentane), 2-cyano-2-propylazoformamide, 2,2'-azobis(N-butyl-2-methylpropionamide), and 2,2'-azobis(N-cyclohexyl-2-metylpropionamide).

It is preferred to suitably select an azo-compound initiator from among these in accordance with the reaction conditions. For example, in the case of low-temperature polymerization (40° C. or lower), it is preferred to use ADVN or 2,2'-azobis(4-methoxy-2,4-dimethylvaleronitrile. In the case of medium-temperature polymerization (40-80° C.), it is preferred to use AIBN, AMBN, MAIB, 1,1'-azobis(1-acetoxy-1-phenylethane), ACVA, 2,2'-azobis(2-methylbutyramide), 2,2'-azobis(2-methylamidinopropane) dihydrochloride, or 2,2'-azobis[2-(2-imidazolin-2-yl)propane]. In the case of high-temperature polymerization (80° C. or higher), it is preferred to use ACHN, 2-cyano-2-propylazoformamide, 2,2'-azobis(N-butyl-2-methylpropionamide), 2,2'-azobis(N-cyclohexyl-2-methylpropionamide), 2,2'-azobis(2,4,4-trimethylpentane), or 2,2'-azobis[2-methyl-N-(2-hydroxyethyl)propionamide].

With respect to the amount of the compound (1) or compound (2) to be used, the compound (1) or compound (2) (the sum of the compound (1) and compound (2) in the case where these compounds are used in combination) is used usually in an amount of 0.0001-0.01 mol, preferably 0.001-0.01 mol, per mole of the compound (3).

With respect to the proportion of the compound (1) or compound (2) and the azo-compound polymerization initiator to be used, the amount of the azo-compound polymerization initiator is usually 0.01-100 mol, preferably 0.1-10 mol, especially preferably 0.1-5 mol, per mole of the compound (1) or compound (2) (per mole of the sum of the compound (1) and compound (2) in the case where these compounds are used in combination).

In the case of using the compound (1) and compound (2) in combination, the amount of the compound (2) to be used is usually 0.01-100 mol, preferably 0.05-10 mol, especially preferably 0.1-5 mol, per mole of the compound (1).

The radical polymerization can be conducted without solvent or can be conducted using an organic solvent or aqueous solvent which are commonly used in radical polymerization.

Examples of the organic solvent include benzene, toluene, pyridine, N,N-dimethylformamide (DMF), dimethyl sulfoxide (DMSO), acetone, acetonitrile, 2-butanone (methyl ethyl ketone), dioxane, hexafluoroisopropanol, chloroform, carbon tetrachloride, tetrahydrofuran (THF), methyl acetate, ethyl acetate, dimethyl carbonate, ethylene carbonate, propylene carbonate, trifluoromethylbenzene, 1H-tridecafluorohexane, 1H,1H,1H,2H,2H-tridecafluorooctane, and 1,1,2,2-tetrafluoroethyl-2,2,2-trifluoroethyl ether, and further include ionic liquids such as N-methyl-N-methoxymethylpyrrolidium tetrafluoroborate, N-methyl-N-ethoxymethyl tetrafluoroborate, 1-methyl 3-methylimidazolium tetrafluoroborate, 1-methyl 3-methylimidazolium hexafluorophosphate, and 1-methyl 3-methylimidazolium chloride.

Examples of the aqueous solvent include water, methanol, ethanol, isopropanol, n-butanol, ethyl cellosolve, butyl cellosolve, 1-methoxy-2-propanol, and diacetone alcohol.

The amount of the solvent to be used may be suitably regulated. For example, the solvent can be used in an amount of 0.01-50 L, preferably 0.05-10 L, especially preferably 0.1-5 L, per 1,000 g of the polymer to be obtained.

Next, the thus-obtained mixture is stirred. The reaction temperature and the reaction time may be suitably regulated in accordance with the molecular weight or molecular-weight distribution of the polymer to be obtained. Usually, however, the stirring is performed at 60-150° C. for 5-100 hours. Preferably, the stirring is performed at 80-120° C. for 10-30 hours. Although this stirring is usually conducted at ordinary pressure, pressurization or decompression may be conducted.

After completion of the reaction, the desired product is isolated by removing the solvent used and the remaining monomers under decompression in an ordinary way to take out the desired polymer or by conducting a reprecipitation treatment using a solvent in which the desired polymer is insoluble. Such reaction treatments can be conducted by any treatment method so long as the desired product is not adversely affected.

The production method of the present invention makes it possible to perform excellent control of molecular weight and control of molecular-weight distribution under very mild conditions.

The molecular weight of the polymer to be obtained by the first embodiment of the present invention can be regulated by changing the reaction time and the amount of the organotellurium compound(s). For example, a polymer having a number-average molecular weight of 500-1,000,000 can be obtained. In particular, the method is suitable for obtaining a polymer having a number-average molecular weight of 1,000-50,000.

The molecular-weight distribution {PD=Mw (weight-average molecular weight)/Mn (number-average molecular weight)} of the polymer to be obtained by the first embodiment of the present invention is controlled so as to be, for example, 2.0 or less. Furthermore, a polymer having a narrower molecular-weight distribution such as, for example, a molecular-weight distribution of 1.5 or less, or even 1.4 or less, can be obtained. The lower limit of the molecular-weight distribution is 1.0 because of the definition thereof.

In this description, the number-average molecular weight and weight-average molecular weight of a polymer are ones determined by SEC (Size Exclusion Chromatography; size exclusion chromatography) measurement, in which polystyrene is used as a reference material for molecular-weight conversion.

It has been ascertained that the terminal groups of the polymer obtained by the first embodiment of the present invention are functional groups containing highly reactive tellurium derived from the organotellurium compound(s).

Thus, use of the organotellurium compound(s) in the radical polymerization makes it easier to convert the terminal groups to other functional groups than in the polymers obtained by a conventional radical polymerization. Accordingly, the polymer obtained by the present invention can be used as a macro radical polymerization initiator (macroinitiator) or a macro radical chain transfer agent.

(Radical Copolymerization of Compound (3) and Compound (6))

In the second embodiment of the present invention, the compound (3) and compound (6) are radical-copolymerized in the presence of the organotellurium compound(s).

a. Block Copolymerization

In the second embodiment of the present invention, using the organotellurium compound(s), it is possible to obtain, for example, an A-B diblock copolymer, such as a trifluoroethylene-butyl acrylate copolymer, or an A-B-A triblock copolymer, such as a trifluoroethylene-butyl acrylate-trifluoroethylene copolymer.

This is because monomers of various different types can be controlled with the organotellurium compound(s) and because the polymer obtained with compound (1), compound (2) or a mixture of these has, at the terminals thereof, functional groups containing highly reactive tellurium.

From the standpoint of obtaining a block copolymer, compound (6) is preferably styrene.

A specific method of producing a block copolymer is as follows.

In the case of an A-B diblock copolymer, for example, in the case of a trifluoroethylene-styrene copolymer, examples of the method include a method in which trifluoroethylene is first mixed with at least one compound selected from the group consisting of the compound (1) and compound (2) to produce polytrifluoroethylene, as in the method of radical polymer production described above, and styrene is subsequently mixed therewith to obtain a trifluoroethylene-styrene copolymer.

In the case of an A-B-A triblock copolymer also, examples of the method include a method in which an A-B diblock copolymer is produced by the method described above and, thereafter, the monomer (A) is mixed therewith to obtain an A-B-A triblock copolymer.

The other conditions for the polymerization are the same as in the first embodiment described above.

After each block has been formed as described above, the reaction for forming the next block may be initiated immediately. Alternatively, after the reaction is temporarily terminated, purification may be performed and the reaction for forming the next block may be then initiated. The block copolymer can be isolated in an ordinary way.

The molecular weight of the polymer to be obtained by the second embodiment (block copolymerization) of the present invention can be regulated by changing the reaction time and the amount of the organotellurium compound(s). For example, a polymer having a number-average molecular weight of 1,000-2,000,000 can be obtained. In particular, the method is suitable for obtaining a polymer having a number-average molecular weight of 2,000-100,000.

The molecular-weight distribution {PD=Mw (weight-average molecular weight)/Mn (number-average molecular weight)} of the polymer to be obtained by the second embodiment (block copolymerization) of the present invention is controlled so as to be, for example, 2.0 or less. Furthermore, a polymer having a narrower molecular-weight distribution such as, for example, a molecular-weight distribution of 1.5 or less, or even 1.4 or less, can be obtained. The lower limit of the molecular-weight distribution is 1.0 because of the definition thereof.

b. Random Copolymerization

In the second embodiment of the present invention, a random copolymer or an alternating copolymer can be obtained by simultaneously reacting the compound (3) and compound (6) using the organotellurium compound(s). It is known that an alternating copolymer is yielded in the case where there is a large difference in the electron density at the double-bond moiety between the comonomers.

From the standpoint of obtaining a random copolymer, compound (6) is preferably styrene or vinyl acetate.

In the case of random copolymerization also, the other conditions for the polymerization are the same as in the first embodiment.

The molecular weight of the polymer to be obtained by the second embodiment (random copolymerization) of the present invention can be regulated by changing the reaction time and the amount of the organotellurium compound(s). For example, a polymer having a number-average molecular weight of 500-1,000,000 can be obtained. In particular, the method is suitable for obtaining a polymer having a number-average molecular weight of 1,000-50,000.

The molecular-weight distribution {PD=Mw (weight-average molecular weight)/Mn (number-average molecular weight)} of the polymer to be obtained by the second embodiment (random copolymerization) of the present invention is controlled so as to be, for example, 2.0 or less. Furthermore, a polymer having a narrower molecular-weight distribution such as, for example, a molecular-weight distribution of 1.5 or less, or even 1.4 or less, can be obtained. The lower limit of the molecular-weight distribution is 1.0 because of the definition thereof.

EXAMPLES

The present invention is explained in detail below by reference to Examples, but the invention is not limited to the following Examples in any way.

Example 1

Into a stainless-steel autoclave having a capacity of 30 mL and equipped with a stirrer were introduced 0.423 g (1.84 mmol) of an azo-compound polymerization initiator "V-601" (manufactured by Wako Pure Chemical Industries), 0.221 g (0.540 mmol) of diphenyl ditelluride, and 14.3 g of acetonitrile, followed by freeze-degassing.

After 15.0 g of trifluoroethylene was pressed thereinto, stirring was initiated while elevating the internal temperature to 80° C. The stirring was continued at 400 rpm for 4 hours while maintaining the internal temperature and, as a result, the internal pressure decreased from 2.38 MPaG to 2.31 MPaG.

The autoclave was cooled with an ice-water bath, and the unreacted trifluoroethylene was then purged.

The polymer solution obtained was added to fluorochemical solvent "Asahiklin AC-2000" (manufactured by Asahi Glass Company Limited), and the polymer precipitated was settled with a centrifugal separator and thus separated from the supernatant. This polymer was dried in a 40° C. vacuum oven for 12 hours, thereby obtaining 1.84 g of a fluoropolymer.

The fluoropolymer had a number-average molecular weight Mn of 3,350 and an Mw/Mn of 1.33. The molecular-weight distribution (Mw/Mn) was 1.5 or less, indicating that the radical polymerization had a feature of living radical polymerization.

$^1$H-NMR analysis revealed that 81.5% of the phenyltellurium groups used was contained in the fluoropolymer.

Example 2

The same procedure as in Example 1 was conducted, except that the azo-compound polymerization initiator "V-601" (manufactured by Wako Pure Chemical Industries) was used in an amount of 0.154 g (0.669 mmol), diphenyl ditelluride was used in an amount of 0.0818 g (0.200 mmol), and acetonitrile was used in an amount of 14.76 g. As a result, the internal pressure decreased from 2.25 MPaG to 1.91 MPaG.

The polymer solution obtained was vacuum-dried, thereby obtaining 4.06 g of a solid. The solid was dissolved in acetonitrile, and the whole was added to the fluorochemical solvent "Asahiklin AC-2000" (manufactured by Asahi Glass Company Limited) to precipitate a polymer. The polymer was taken out by filtration with a polytetrafluoroethylene filter (pore size, 0.5 μm) and dried in a 40° C. vacuum oven for 12 hours.

The fluoropolymer had a number-average molecular weight Mn of 11,400 and an Mw/Mn of 1.40.

$^1$H-NMR analysis revealed that 72.8% of the phenyltellurium groups used was contained in the fluoropolymer.

Example 3

Into a glass reactor having a capacity of 30 mL and equipped with a degassing tube and a valve were introduced 1.72 g of the fluoropolymer obtained in Example 2, 0.0168 g (0.0730 mmol) of the azo-compound polymerization initiator "V-601" (manufactured by Wako Pure Chemical Industries), 5.23 g of pyridine, 2.73 g of styrene, and a stir bar, followed by freeze-degassing repeated twice.

Stirring was initiated while elevating the temperature of the water bath to 70° C. The stirring was continued at 400 rpm for 4 hours while maintaining the temperature. After the reactor was cooled, the contents were dried in a 40° C. vacuum oven for 12 hours, thereby obtaining 2.32 g of a solid.

The solid obtained had a number-average molecular weight Mn of 38,300 and an Mw/Mn of 1.24.

Example 4

Into a stainless-steel autoclave having a capacity of 30 mL and equipped with a stirrer were introduced 0.532 g (2.31 mmol) of the azo-compound polymerization initiator "V-601" (manufactured by Wako Pure Chemical Industries), 0.208 g (0.508 mmol) of diphenyl ditelluride, and 14.3 g of acetonitrile, followed by freeze-degassing. The autoclave was heated with an 80° C. hot-water bath for 2 hours and then allowed to stand still in a −60° C. freezer overnight.

Subsequently, after 15.0 g of trifluoroethylene was pressed thereinto, stirring was initiated while elevating the internal temperature to 80° C. The stirring was continued at 400 rpm for 4 hours while maintaining the internal temperature and, as a result, the internal pressure increased to 2.4 MPaG.

The autoclave was cooled with an ice-water bath, and the unreacted trifluoroethylene was then purged. The polymer solution obtained was dried in a 40° C. vacuum oven for 12 hours, thereby obtaining 0.68 g of a solid.

The solid obtained had a number-average molecular weight Mn of 32,700 and an Mw/Mn of 1.82.

Example 5

Into a stainless-steel autoclave having a capacity of 30 mL and equipped with a stirrer were introduced 0.5 g of 2,2-azobis(isobutyronitrile), 0.2 g of ethyl-2-methyl-2-n-butyl-tellanyl-propionate (synthesized in accordance with Synthesis Example 10 described in International Publication WO 2004/014848), 7 g of vinyl acetate, and 14 g of acetonitrile, followed by freeze-degassing. After 8 g of tetrafluoroethylene was pressed thereinto, stirring was initiated while elevating the internal temperature to 60° C. The stirring was continued at 400 rpm for 4 hours while maintaining the internal temperature.

The autoclave was cooled with an ice-water bath, and the unreacted tetrafluoroethylene was then purged. The polymer solution obtained was dried in a 40° C. vacuum oven for 12 hours, thereby obtaining a solid.

Reference Example 6

A stainless-steel autoclave having a capacity of 1 L was evacuated under vacuum. Thereinto were introduced 420 g of deionized water, 0.13 g of partially saponified polyvinyl alcohol (degree of saponification of 80% by mole; average degree of polymerization of 2,600), and 0.05 g of hydroxypropyl methyl cellulose. Then, nitrogen gas displacement was conducted three times. Subsequently, thereinto were introduced 0.5 g of 2,2-azobis(isobutyronitrile) and 0.2 g of diphenyl ditelluride, which had been dissolved and dispersed in 40 mL of ethanol. Furthermore, 130 g of vinyl chloride monomer was pressed thereinto. Thereafter, stirring was initiated while elevating the internal temperature to 60° C. The stirring was continued for 5 hours while maintaining the internal temperature.

The autoclave was cooled with an ice-water bath, and the unreacted vinyl chloride was then purged. After the suspension-polymerization slurry was filtered, washing with 2 L of deionized water was conducted. Thereafter, decompression-drying at 35° C. for 3 hours and then further decompression-drying at 65° C. for 3 hours were conducted, thereby obtaining a vinyl chloride polymer.

While the present invention has been described in detail and with reference to specific embodiments thereof, it will be apparent to one skilled in the art that various changes and modifications can be made therein without departing from the spirit and scope thereof. This application is based on a Japanese patent application filed on Mar. 9, 2017 (Patent Application No. 2017-045408), the contents thereof being incorporated herein by reference.

The invention claimed is:

1. A method of producing a polymer comprising:
polymerizing a compound represented by the following formula (3); or
copolymerizing the compound represented by the following formula (3) with a compound (6) having a reactive carbon-carbon double bond and differing from the compound represented by the following formula (3),
in a presence of at least one compound selected from the group consisting of compounds represented by the following formula (1) and compounds represented by the following formula (2):

wherein formula (1), $R^1$ represents an alkyl group having a carbon number of 1-8, a substituted alkyl group having a carbon number of 1-8, an aryl group having a carbon number of 3-12, or a substituted aryl group having a carbon number of 3-16; $R^2$ and $R^3$ each independently represent a hydrogen atom or an alkyl group having a carbon number of 1-8; and $R^4$ represents a hydrogen atom, an alkyl group having a carbon number of 1-8, a substituted alkyl group having a carbon number of 1-8, an aryl group having a carbon number of 3-12, a substituted aryl group having a carbon number of 3-16, an acyl group having a carbon number of 2-8, an amide group having a carbon number of 2-8, an oxycarbonyl group, or a cyano group;

$(R^5Te)_2$     (2)

wherein formula (2), $R^5$ represents an alkyl group having a carbon number of 1-8, a substituted alkyl group having a carbon number of 1-8, an aryl group having a carbon number of 3-12, or a substituted aryl group having a carbon number of 3-16; and

(3)

wherein formula (3), $X^1$ represents a fluorine atom; $X^2$, $X^3$, and $X^4$ each independently represent a hydrogen atom, a fluorine atom, a chlorine atom, or —$CX^5X^6X^7$; and $X^5$, $X^6$, and $X^7$ each independently represent a hydrogen atom, a fluorine atom, or a chlorine atom, to form the polymer.

2. The method of producing a polymer according to claim 1, wherein the compound represented by the formula (3) is one or more selected from the group consisting of vinyl fluoride, vinylidene fluoride, trifluoroethylene, chlorotrifluoroethylene, tetrafluoroethylene, hexafluoropropylene, tetrafluoropropylene, 1-chloro-1-fluoroethylene, and 1,2-dichloro-1,2-difluoroethylene.

3. The method of producing a polymer according to claim 1, wherein the compound represented by the formula (1) is a compound in which $R^1$ is an alkyl group having a carbon number of 1-4 or a phenyl group, $R^2$ and $R^3$ are each independently a hydrogen atom or an alkyl group having a carbon number of 1-4, and $R^4$ is an aryl group having a carbon number of 5-12 or an oxycarbonyl group.

4. The method of producing a polymer according to claim 1, wherein the compound represented by the formula (2) is a compound in which $R^5$ is an alkyl group having a carbon number of 1-4 or a phenyl group.

5. The method of producing a polymer according to claim 1, providing the polymer having a molecular-weight distribution of 2.0 or less.

6. The method of producing a polymer according to claim 1, further comprising:
initiating the polymerizing or the copolymerizing with an azo-compound polymerization initiator.

7. The method of producing a polymer according to claim 6, wherein the azo-compound polymerization initiator is used in an amount of 0.01-100 mol per mole of a total amount of the compound represented by the formula (1) and the compound represented by the formula (2).

8. The method of producing a polymer according to claim 1, wherein the compound represented by the formula (3) and the compound (6) are copolymerized by a block copolymerization.

9. The method of producing a polymer according to claim 8, wherein the compound (6) is styrene.

10. The method of producing a polymer according to claim 1, wherein the compound represented by the formula (3) and the compound (6) are copolymerized by a random copolymerization.

11. The method of producing a polymer according to claim 10, wherein the compound (6) is styrene or vinyl acetate.

12. The method of producing a polymer according to claim 1, comprising polymerizing the compound represented by formula (3), wherein the polymerizing is a living radical polymerizing.

13. The method of producing a polymer according to claim 1, comprising copolymerizing the compound represented by formula (3) with the compound (6), wherein the copolymerizing is a living radical copolymerizing.

14. The method of producing a polymer according to claim 1, wherein the polymerizing or the copolymerizing forms a polymer having a molecular-weight distribution of 1.5 or less.

15. The method of producing a polymer according to claim 1, wherein the polymerizing or the copolymerizing forms a polymer having a number-average molecular weight of 1,000-50,000.

16. The method of producing a polymer according to claim 1, wherein the compound represented by formula (3) is gaseous and the polymerizing or the copolymerizing is carried out in the presence of a solvent at an elevated pressure.

17. The method of producing a polymer according to claim 1, comprising copolymerizing the compound represented by formula (3) and the compound of formula (6) to form a random copolymer, wherein the compound of formula (6) is at least one selected from the group consisting of styrene and vinyl acetate.

18. The method of producing a polymer according to claim 1, wherein the polymer comprises phenyltellurium groups.

19. The method of producing a polymer according to claim 1, wherein the compound of formula (3) is trifluoroethylene and the compound represented by formula (1) or formula (2) has at least one phenyltellurium group.

* * * * *